April 5, 1927. 1,623,355
W. B. MINCH
WHEEL
Filed Nov. 20, 1922
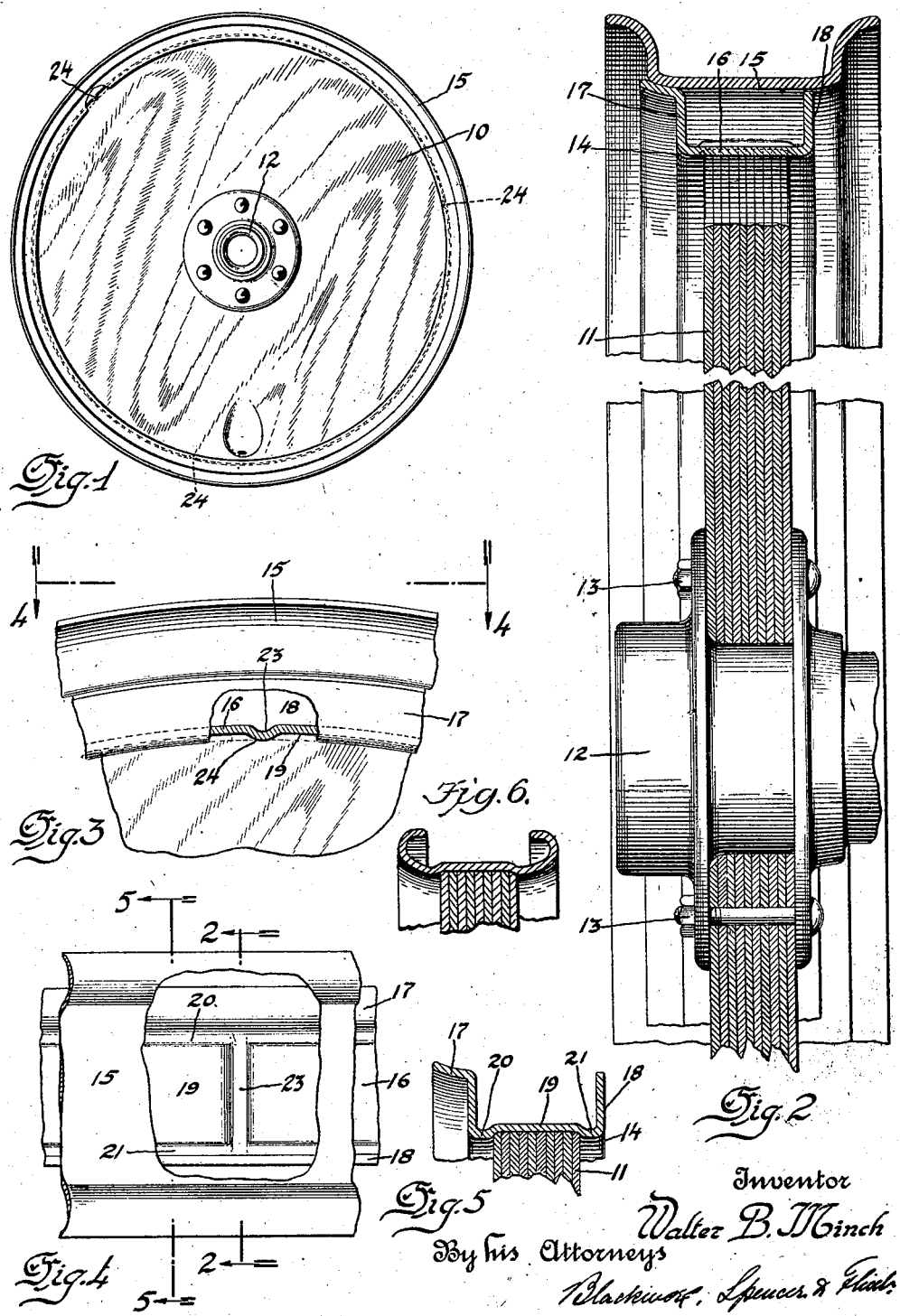

Patented Apr. 5, 1927.

1,623,355

UNITED STATES PATENT OFFICE.

WALTER B. MINCH, OF JACKSON, MICHIGAN, ASSIGNOR TO GENERAL MOTORS CORPORATION, OF DETROIT, MICHIGAN, A CORPORATION OF DELAWARE.

WHEEL.

Application filed November 20, 1922. Serial No. 602,187.

This invention relates to wheels and more particularly to wheels for motor vehicles.

One of the objects of the invention is the provision of a new and improved wheel assembly.

Another object of the invention is the provision of new and improved means for securing a fixed rim to its support.

A still further object of the invention is the provision of new and improved means for, and method of, assembling a disk wheel.

Other and further objects and advantages of the invention will appear from the following description taken in connection with the accompanying drawings, in which, Fig. 1 is a side elevation of the improved wheel with parts broken away.

Fig. 2 is a vertical section on line 2—2 of Fig. 4, with parts broken away.

Fig. 3 is a detail view, with parts broken away.

Fig. 4 is a plan view of Fig. 3, with parts broken away, and looking in the direction of the arrows 4—4, of Fig. 3; and, Fig. 5 is a sectional view on line 5—5 of Fig. 4, with the rim removed.

Figure 6 shows in section a modified form wherein no demountable rim is used.

On the drawing, the reference numeral 10, designates a wheel of any suitable construction but for simplicity of illustration and convenience of description is shown as being a laminated disk wheel, comprising the rim support 11, formed from fibrous material such as wood or other suitable material. As shown, the support 11 is formed of a plurality of layers of wood secured together in any suitable manner. The disk or rim support 11 is secured to the hub 12, of the wheel as by means of the bolts 13, as is usual in such constructions. A fixed rim or felly 14 is rigidly secured to said support and is adapted to have detachably mounted thereon the rim 15, as is usual in such construction. While both a fixed and a detachable rim are shown in the preferred form, it is understood that the felly 14 may be so formed as to constitute of itself a tire receiving rim one such embodiment being shown in Figure 6.

The felly 14 comprises the base portion 16 and the side flanges 17 and 18, which latter may be of the usual or well known construction. As shown, the base portion 16 of the fixed rim is rolled in such a manner as to form an outwardly extending depression 19 having a width equal to the thickness of the disk or support 11. The depression 19 in the base portion 16, of the fixed rim forms beads or shoulders 20 and 21, which are adapted to engage the side faces of said disk or support 11 to prevent lateral movement of said fixed rim on said rim support. In other words, the depression 19 forms a groove in which the disk or rim support 11 is adapted to engage.

The base portion 16 of the fixed rim or felly is also provided with a plurality of inwardly extending projections. These projections are adapted to engage the rim support or disk 11 to form drivers for the rim. These projections may be formed in any suitable manner. As shown on the drawing, the base portion is depressed at intervals to form the projections 23. These projections are adapted to extend transversely of the base 16, and are preferably rolled in the rim. They are adapted to form drivers for the fixed rim and any suitable number of them may be used. As shown, three of them arranged at an angle of 120 degrees apart are employed.

In assembling a fixed rim on the support or disk 11, the felly which may be made slightly oversize, is first heated and then placed in position on the disk or support 11, and is then upset on said disk by an upsetting device. Upon cooling, the shrinking of the felly will cause the same to seat very tightly and put a considerable initial strain upon the wood disk thus making any other means of connection between the disk and the felly unnecessary. The drivers 23 will be forced into the wood, forming grooves 24 therein, which will prevent any circumferential movement of the felly relative to its support.

While I have shown the fixed rim support as comprising a laminated wood construction, it is to be understood that the invention is not so limited. In case, however, metallic felly supports be employed it will be necessary, of course, to provide suitable grooves in the support for the reception of the drivers 23 of the felly.

It will be understood that various changes in the form, construction, composition and arrangement of the several parts may be resorted to without departing from the spirit and scope of my invention; hence I do not wish to limit myself strictly to the structure herein set forth, but,

What I claim is:

1. In a device of the class described, a circular support having recesses in the periphery thereof, and a fixed rim mounted on said support and provided with projections engaging said recesses.

2. In a device of the class described, a channel-shaped fixed rim having a circumferential depression in its base portion and provided with inwardly extending beads, arranged transversely to said depression and a circular wheel support mounted in said depression and having recesses in which said beads engage.

3. In a device of the class described, a wheel comprising a hub, a laminated wooden disk rim support rigidly secured to said hub and provided with recesses in its outer portion, a fixed rim provided with spaced apart shoulders for engaging each side face of said support and having projections for engaging said recesses to prevent circumferential movement of said rim relative to said support.

4. In a device of the class described, a fixed rim having an outwardly extending depression extending circumferentially thereof and a rim support mounted in said depression, substantially as shown and described.

5. In a device of the class described, a fixed rim having an outwardly extending circumferential depression and an inwardly extending projection rolled in the base thereof, and a circular rim support secured in said depression and provided with a recess for the reception of said projection.

6. A wheel comprising a hub, a disc and a fixed rim, the disc being composed of a plurality of layers of wood, the rim having a base portion provided with a circumferential groove, receiving the outer periphery of the disc.

7. A wheel having a hub, a disc secured to the hub, a fixed rim having a circumferential groove receiving the outer edge of the disc, a plurality of driving ribs, extending transversely across the rim and entering corresponding recesses in the edge of the disc.

8. A wheel comprising a hub, a disc composed of a plurality of layers of fibrous material and secured to the hub, a fixed metallic rim member having a circumferential groove with a plurality of transverse driving ribs, the rim being shrunk on the periphery of the disc so that the rim shall be firmly held on the disc.

In testimony whereof I affix my signature.

WALTER B. MINCH.